June 2, 1942.  R. ZDANOWICH  2,285,072
MEANS FOR DAMPING VIBRATIONS IN RECIPROCATING ENGINES
Filed June 2, 1941   2 Sheets-Sheet 1
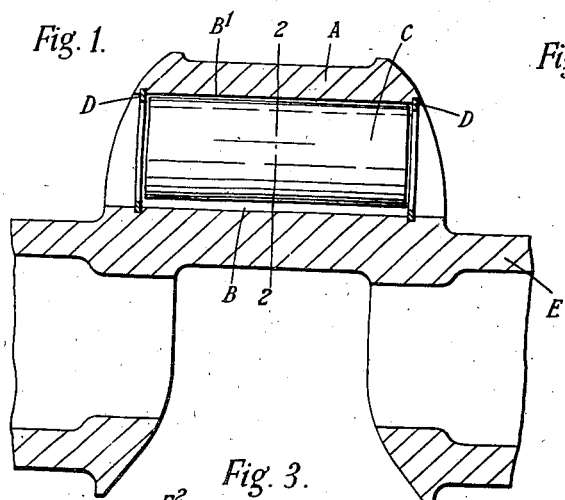
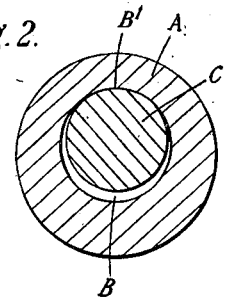
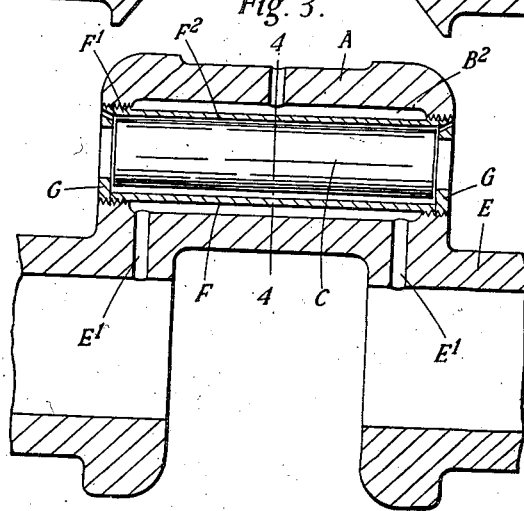
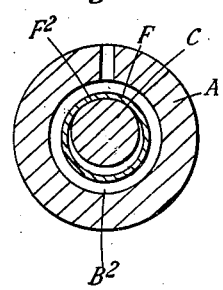
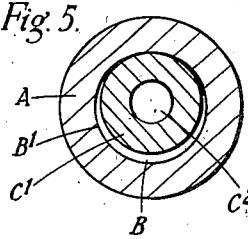
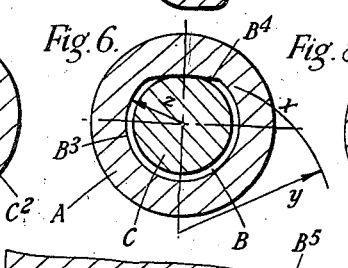
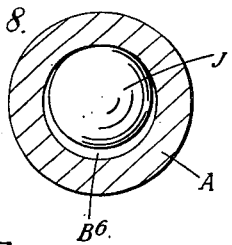
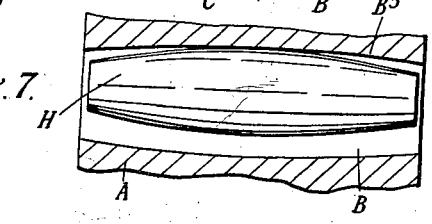
INVENTOR
R. ZDANOWICH
BY Blair+Kilcoyne
ATTORNEYS Patented June 2, 1942

2,285,072

UNITED STATES PATENT OFFICE 2,285,072

MEANS FOR DAMPING VIBRATIONS IN RECIPROCATING ENGINES

Richard Zdanowich, London, England, assignor to D. Napier & Son Limited, London, England, a company of Great Britain Application July 2, 1941, Serial No. 400,855
In Great Britain June 21, 1940

16 Claims. (Cl. 74—604)

This invention relates to means for damping vibrations in crankshafts of reciprocating engines and has for its object to effect a damping of both torsional and also longitudinal vibrations.

According to this invention a body which is a figure of revolution is disposed within a hollow crank pin where the body is free to roll and move. A roller-like body may be used and formed and disposed so that it can merely roll, as in the case of a cylindrical body, or so that it can both roll and also rock or otherwise move in the plane which contains its axis as in the case of a body having a form which may be described as barrel-shaped, or a spherical body may be employed. The hollow in the crank pin may extend right through the length of the pin and the track on which the body rolls in this hollow may be constituted by the wall of the bore of this hollow. If the lubricating oil is led through the crank pin it is preferable to exclude this oil from the track and space where is the rolling body. This may be effected by fixing a sleeve in the bore of the crank pin, as by external enlargements on the ends of the sleeve which engage the end portions of the bore. The sleeve has an external diameter which is less than the internal diameter of the bore and it thus provides a closed annular space between the bore and the sleeve through which the oil can flow while the body is free to roll within the sleeve which constitutes the track for the body.

The track on which the body rolls whether this is constituted by the wall of the bore in the crank pin or by a sleeve inserted therein, as seen in cross-section is either wholly circular or alternatively mainly circular and in the latter case has an arc with a curvature which differs from that of the circular part. Where the rolling body is cylindrical the track on which it rolls is either wholly cylindrical or mainly so with a part extending along it which has a different curvature in cross-section. If a barrel-shaped body is used the track extends in width through the crank pin and in cross-section is wholly or at least mainly circular, but in the direction of its axis is concavely curved. Such a track is thus curved in two planes at right angles to each other with one of these planes containing the axis of the track. The part of the track which may extend as a longitudinal strip and is not continuously circular as is the remainder of its surface, has a different curvature as seen in cross-section. The roller body which lies and moves on this track is barrel-shaped with its surface convexly curved in the direction of its axis and thus cannot merely roll but may also rock or otherwise move in the plane which contains its axis. The curvature of the track in the direction of its axis differs from the curvature in the same direction of the surface of the roller body. Such a track which is curved in two planes as described above may be formed either by the wall of the bore in the crank pin or constituted by a sleeve inserted in that bore.

If the track as seen in cross-section has an arc with a curvature differing from that of the main part of the track, this arc may be a portion of a circle having a radius which differs from that of the remaining and circular portion of the track, or the arc may be parabolic, elliptic or hyperbolic or may have some other curvature as may be desirable.

If the rolling body is cylindrical it will exert a damping effect on torsional vibrations, but if it is barrel-shaped or a sphere and is free to move in the track in the direction of the crank pin axis and also to roll in a plane at right angles to that axis, it will exert as well a damping effect on longitudinal vibrations. It is found that by suitably selecting the weight and dimensions of the rolling body and by disposing it in the crank pin a more satisfactory result is obtainable than with the known arrangement mentioned above where a body is mounted so that it can roll in a crank web or fly wheel.

The roller body if formed cylindrical or barrel-shaped may be solid or hollow.

A vibration damper constructed and arranged in the crank pin according to this invention is simple and involves no material alteration in the design or manufacture of the crankshaft itself. By varying the size or weight or both of the rolling body or the curvature of the track on which it moves it can be readily adjusted to the particular requirements of the crankshaft. Where the body is of roller-like form and is made hollow it is a simple procedure to alter its weight.

The accompanying drawings illustrate somewhat diagrammatically and by way of example alternative ways of carrying the invention into practice. In these drawings, Figure 1 is a longitudinal sectional elevation of the crank pin of an engine showing one arrangement of the vibration damping body.

Figure 2 is a transverse section on the line 2—2 in Figure 1.

Figure 3 is a view similar to Figure 1 but showing an arrangement in which the track for the rolling body is constituted by a sleeve inserted in the hollow crank pin.

Figure 4 is a transverse section on the line 4—4 in Figure 3.

Figure 5 is a transverse section of a crank pin similar to Figures 2 and 4 and showing a hollow roller body.

Figure 6 is again a transverse section of a crank pin showing how the track for the rolling body may be made mainly circular, but with an arc which has a curvature differing from that of the circular part.

Figure 7 is a part longitudinal sectional elevation of a crank pin with a barrel-shaped roller body therein.

Figure 8 is a transverse section of a crank pin with a sphere disposed in it.

Figure 9:
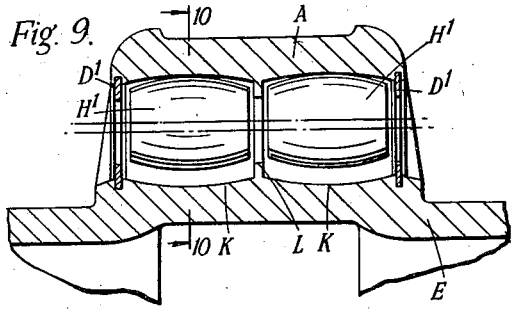
Figure 9 is a longitudinal sectional elevation showing a modified arrangement in which two separate roller bodies are disposed in the crank pin.

Referring to the arrangement shown in Figures 1 and 2, the crank pin A is formed hollow with this hollow B cylindrical and extending right through the crank pin. In this hollow and free to roll on the track $B^1$ formed thereby lies a cylindrical body C which is kept in place by washer-like members D which are sprung into annular recesses in the end portions of the bore B of the crank pin. As the crankshaft E rotates centrifugal force will tend to cause the roller C to assume such a position as shown in the figure and the movements of its mass will exert a damping effect on torsional vibrations in the crankshaft. It will be seen from Figure 2 that in this case the track $B^1$ formed by the wall of the bore B is wholly cylindrical.

In Figure 3 there is shown as inserted in the hollow crank pin A a sleeve F whose external diameter is such that there is around it an annular space $B^2$ which is closed at its ends by the engagement of screwthreaded enlargements $F^1$ on the ends of the sleeve with the end portions of the bore in the crank pin. Within the sleeve and free to roll on the track $F^2$ constituted by its inner surface is a roller C which is kept in place by washers G screwed into the ends of the bore in the crank pin and serving also to prevent displacement of the sleeve F. In this case lubricant flowing through the crankshaft E and by way of the passages $E^1$ into the crank pin A will pass in the space $B^2$ around the sleeve F and will not enter the sleeve where it might tend to interfere with the movements of the roller C.

Figure 5 shows a roller-like body $C^1$ which is formed hollow as at $C^2$. By inserting tubular or other members in the hollow $C^2$ it is possible to vary the weight of the body $C^1$ in a simple manner.

Referring to Figure 6 there is shown in this cross-section as formed in the hollow B in the crank pin a track which while being mainly circular as at $B^3$ has an arc $B^4$ with a different curvature. In this case the arc $B^4$ is a portion of a circle $x$ having a radius $y$ which is greater than the radius $z$ of the main part $B^3$ of the track. The arc $B^4$ need not be a part of a circle, but may be a curve of some other type as may be desirable and in accordance with the effect which such curve is to have on the movements of the roller. As shown the roller C which moves on this track is wholly circular in cross-section.

In Figure 7 there is shown a barrel-shaped roller body H, that is one which while being circular in cross-section throughout its length has its surface curved in the direction of its axis. The track $B^5$ constituted by the wall of the bore B in the crank pin A is correspondingly curved in the direction of its axis this curvature, however, considered in the plane which contains that axis differing from the end to end curvature of the surface of the roller H. The curvature of this track $B^5$ as it appears in planes normal to the axis of the crank pin may be circular or mainly circular having in the latter case a part formed to a different curvature. A track thus not wholly circular may appear in cross-section somewhat as shown in Figure 6 as described above. Such a barrel-shaped roller will not only be free to roll on this track but it can also move as by rocking or otherwise in the plane which contains its axis. The roller H may be kept in place in the bore B in the crank pin by washers sprung into annular grooves in the end portions of this bore in the same way as the washers D in the arrangement shown in Figure 1. It will be understood that if preferred a track such as the track $B^5$ curved in two planes at right angles to each other may be constituted by the inner surface of a sleeve inserted in the bore B in the same way as the sleeve F in the arrangement shown in Figure 3.

Figure 8 shows a ball J in a hollow $B^6$ in the crank pin A. This hollow is at least partly spherical with an opening thereinto from only one or from each end of the crank pin. The ball may be kept in place by a plug or washer-like member inserted in the end of the crank pin. The ball J is free to roll on the track both in the direction of the crank pin axis and also in a plane normal to that axis. The curvature of this track in these two directions may be the same or these curvatures may be different.

Both the barrel-shaped roller H shown in Figure 7 and also the ball J as shown in Figure 8 serve to effect a damping of longitudinal as well as torsional vibrations.

In Figures 9 to 15 there are shown several alternative arrangements in each of which at least two separate bodies are arranged within the hollow crank pin.

Figure 10:
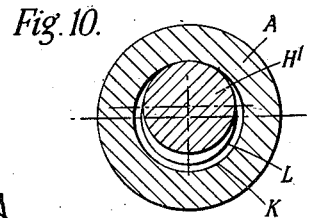
Figure 10 is a transverse section on the line 10—10 in Figure 9 looking in the direction of the arrows.

Referring to Figure 9 the crank pin A has a hollow extending right through it and in this are formed two separate but similar tracks K each of which extends throughout approximately half the length of the bore in the crank pin, the two tracks being separated by a central annular flange L. Each track is circular in cross-section, as seen in Figure 10, but is curved in the direction of the axis of the bore. In each compartment, as it may be termed, of the bore of the crank pin there is a barrel-shaped roller $H^1$. These barrel-shaped bodies are similar and each is free not only to roll on its track K but also to move in the direction of the axis of the crank pin. The extent to which the bodies are free to move towards each other is determined by the flange L. Movement outwardly is prevented except to a limited extend and this is determined by washers $D^1$ sprung into annular grooves formed in the end portions of the bore in the crank pin.

Figure 11:
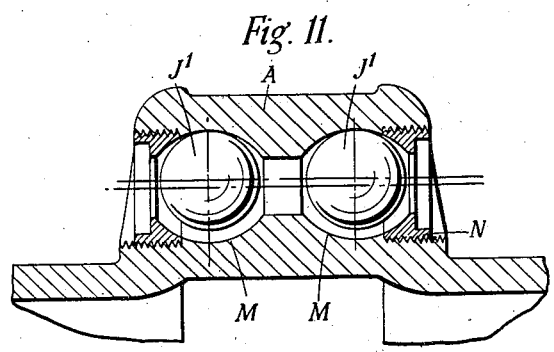
Figure 11 is a part-longitudinal sectional elevation of an arrangement in which two spherical bodies are disposed in the crank pin to effect the damping of vibrations.

In Figure 11 the bodies which effect the damping are two similar balls $J^1$ each of which lies in a hollow which extends into the crank pin from one end thereof and has a formation as at M which constitutes a track on which one of the balls can roll. Each ball is kept in the hollow in which it lies by an annular plug N which is screwed into the end portion of the crank pin and is formed internally with a surface with a curvature which cooperates with the track surface M within the crank pin. The track for each ball considered in a plane normal to the axis of the crank pin is circular, or mainly circular, since in the latter case it may have an arc of a different curvature. The curvature of each track considered in the plane containing the axis of the crank pin may be the same as the main curvature of the track as it appears in a plane normal to the crank pin axis, or the curvature in these two directions may differ.

Figure 12:
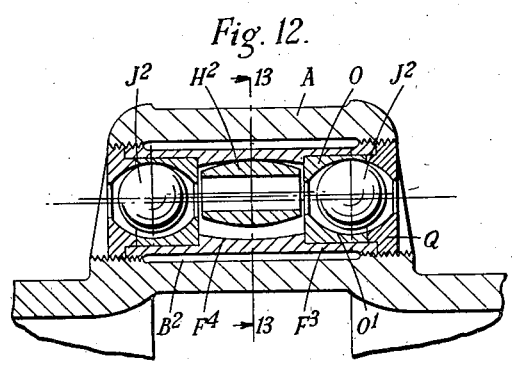
Figure 12 is a similar view of an arrangement in which the bodies which effect the damping are three in number and comprise a roller body having adjacent to each end a ball, the tracks for these bodies being provided in a sleeve which is inserted in the hollow in the crank pin.
Figure 13:
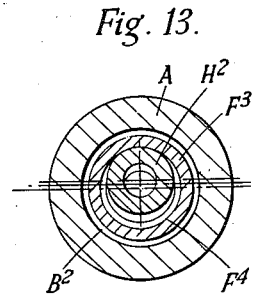
Figure 13 is a transverse section on the line 13—13 in Figure 12.

Referring to Figure 12 there is here placed within the hollow in the crank pin A a sleeve $F^3$ which is arranged so as to leave an annular space $B^2$ around it for the passage of lubricating oil, the arrangement in this respect resembling that described above in reference to the construction shown in Figures 3 and 4. The centre portion of the sleeve $F^3$, considered in the direction of its length, is formed internally with a surface $F^4$ constituting a track which is circular or mainly circular as seen in a section normal to the crank pin axis, such a section being shown in Figure 13, but is curved in the direction of that axis. A hollow barrel-shaped body $H^2$ is disposed here and is free to roll on the track $F^4$ and also to rock or move similarly in the direction of the axis of the crank pin. Within each end portion of the sleeve $F^3$ there is placed a plug O having an internal formation constituting a track $O^1$ for a ball $J^2$. This ball is kept in the hollow within which it lies by an annular plug member Q screwed into the end of the bore in the crank pin. This plug Q also serves to keep in place the track plug O and the inner surfaces of these parts are formed similarly, or they may have different curvatures respectively in the directions of and in a plane normal to the crank pin axis. The track on which each ball can roll and otherwise move is circular or mainly circular as seen in cross-section normal to the crank pin axis. By forming the barrel-shaped roller body $H^2$ hollow, as in this case, it is possible to insert cylindrical members therein in order to vary its weight.

Figure 14:
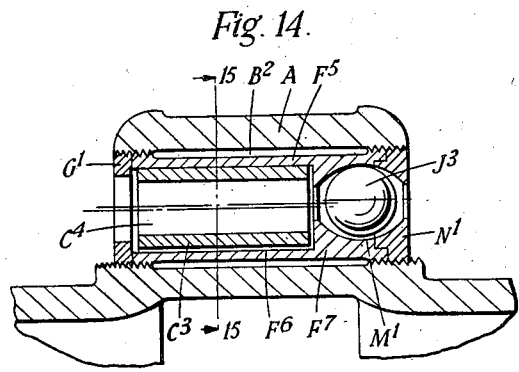
Figure 14 is again a part-longitudinal sectional elevation of a further modification in which a hollow and cylindrical roller-like body is disposed with a single ball in a sleeve placed within the hollow in the crank pin.
Figure 15:
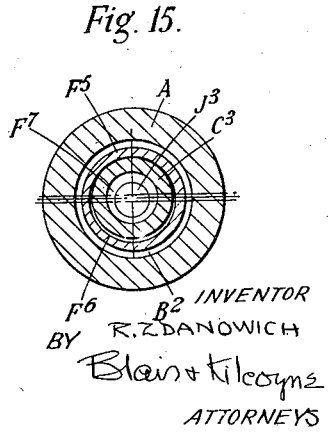
Figure 15 is a transverse section on the line 15—15 in Figure 14 looking in the direction of the arrows.

In the construction shown in Figures 14 and 15 two bodies are provided to effect the damping of the vibrations both these bodies being disposed within a sleeve $F^5$ suitably fixed within the bore in the crank pin A. One of these damping bodies is a cylindrical roller $C^3$ similar to that shown in Figures 3 and 4, but conveniently formed with a hollow $C^4$ therein as in the arrangement shown in Figure 5. This roller $C^3$ rolls on a track $F^6$ formed within the sleeve $F^5$ and is kept in place by an annular washer $G^1$ screwed into the end of the bore in the crank pin. Within the sleeve and towards the other end thereof is an inwardly projecting part $F^7$ one face of which serves as an abutment for the adjacent end of the roller body $C^3$. This part $F^7$ has formed in it a track $M^1$ which is partly spherical or circular or mainly circular in cross-section and suitably curved in the direction of the crank pin axis. On this track can roll a ball $J^3$ which is kept in the hollow in that end of the sleeve by an annular plug member $N^1$ which is screwed into the end of the bore in the crank pin and thus serves to assist in keeping the sleeve $F^5$ in place. The plug member $N^1$ is formed internally to complete the double curvature of the track $M^1$. In this case the roller $C^3$ serves to damp out torsional vibrations in the crankshaft while the ball $J^3$ effects a damping of the longitudinal vibrations.

What I claim as my invention and desire to secure by Letters Patent is:

1. In means for damping vibrations in crankshafts, the combination of a crank pin having a hollow in this crank pin in which is a surface constituting a track, and a body which is a figure of revolution disposed within the crank pin and free to roll on the track therein.

2. In means for damping vibrations in crankshafts, the combination of a crank pin having a hollow in this crank pin in which is a surface constituting a track, and a roller body which is disposed within the crank pin and is free to roll on the said track and also to move thereon in the direction of the crank pin axis.

3. In means for damping vibrations in crankshafts, the combination of a crank pin having a hollow extending through this crank pin in which is a surface constituting a track, and a cylindrical body disposed within the crank pin and free to roll on the track therein.

4. In means for damping vibrations in crankshafts, the combination of a crank pin with a hollow extending through it, a sleeve disposed in this hollow the external diameter of the sleeve being less than the internal diameter of the hollow in the crank pin, means for fixing the sleeve in the said hollow and thereby forming an annular closed space around the sleeve, and a body which is a figure of revolution disposed within the sleeve and free to roll therein on the track constituted by the inner surface of the sleeve.

5. In means for damping vibrations in crankshafts, the combination of a crank pin having a hollow in this crank pin in which is a surface constituting a track which is mainly circular but has an arc with a curvature which differs from that of the circular part, and a body which is a figure of revolution disposed within the crank pin and free to roll on the track therein.

6. In means for damping vibrations in crankshafts, the combination of a crank pin having a hollow in this crank pin in which is a surface constituting a track which is at least mainly circular in cross-section normal to the crank pin axis and is concavely curved in the direction of that axis, the track being thus curved in two planes at right angles to each other with one of these planes containing the axis of the crank pin, and a body which is a figure of revolution disposed within the crank pin and free to roll on the said track and also to move in the direction of the crank pin axis.

7. In means for damping vibrations in crankshafts, the combination of a crank pin having a hollow in this crank pin in which is a surface constituting a track which is at least mainly circular in cross-section normal to the crank pin axis and is concavely curved in the direction of that axis, the track being thus curved in two planes at right angles to each other with one of these planes containing the axis of the crank pin, and a roller-like body disposed within the crank pin and free to roll on the said track and also to move in the direction of the crank pin axis.

8. In means for damping vibrations in crankshafts, the combination of a crank pin having a hollow in this crank pin in which is a surface constituting a track which is at least mainly circular in cross-section normal to the crank pin axis and is concavely curved in the direction of that axis, the track being thus curved in two planes at right angles to each other with one of these planes containing the axis of the crank pin, and a roller-like body which is circular in cross-section normal to its axis but whose surface is convexly curved in the direction of that axis disposed within the crank pin and free to roll on the said track and also to move in the direction of the crank pin axis.

9. In means for damping vibrations in crankshafts, the combination of a crank pin having a hollow extending through this crank pin in which is a surface constituting a track which is mainly circular but has an arc with a curvature which differs from that of the circular part, and a cylindrical body disposed within the crank pin and free to roll on the said track.

10. In means for damping vibrations in crankshafts, the combination of a crank pin with a hollow extending through it, a sleeve disposed in this hollow the external diameter of the sleeve being less than the internal diameter of the hollow in the crank pin, means for fixing the sleeve in the said hollow and thereby forming an annular space around the sleeve, and a cylindrical body disposed within the sleeve and free to roll therein on the track constituted by the inner surface of the sleeve.

11. In means for damping vibrations in crankshafts, the combination of a crank pin, a hollow in this crank pin in which is a surface constituting a track, and a body which is a figure of revolution disposed within the crank pin and free to roll on the track and also to move thereon in the direction of the crank pin axis.

12. In means for damping vibrations in crankshafts, the combination of a crank pin having a hollow extending through this crank pin in which is a surface constituting a track, a body which is a figure of revolution disposed within the crank pin and free to roll on the track, and means for retaining the said body in the said hollow in the crank pin.

13. In means for damping vibrations in crankshafts, the combination of a crank pin having a hollow in this crank pin in which is a surface constituting a track, and a hollow body which is a figure of revolution disposed within the crank pin and free to roll on the track.

14. In means for damping vibrations in crankshafts, the combination of a crank pin having a hollow in this crank pin in which is a surface constituting a track, and a hollow roller-like body which is disposed within the crank pin and is free to roll on the said track and also to move thereon in the direction of the crank pin axis.

15. In means for damping vibrations in crankshafts, the combination of a crank pin having a hollow extending through this crank pin in which is a surface constituting a track, and a hollow cylindrical body disposed within the crank pin and free to roll on the track therein.

16. In means for damping vibrations in crankshafts, the combination of a crank pin with a hollow extending through it, a sleeve disposed in this hollow the external diameter of the sleeve being less than the internal diameter of the hollow in the crank pin, means for fixing the sleeve in the said hollow and thereby forming an annular closed space around the sleeve, a hollow body which is a figure of revolution disposed within the sleeve and free to roll therein on the track constituted by the inner surface of the sleeve, and means for retaining this body in the said sleeve.

RICHARD ZDANOWICH.